United States Patent [19]
Kebukawa

[11] Patent Number: 5,721,456
[45] Date of Patent: Feb. 24, 1998

[54] OPTICAL TRANSMITTER

[75] Inventor: Norio Kebukawa, Tokyo, Japan

[73] Assignee: Mitsubishi Denki Kabushiki Kaisha, Tokyo, Japan

[21] Appl. No.: 758,364

[22] Filed: Dec. 3, 1996

[30] Foreign Application Priority Data

Jan. 17, 1996 [JP] Japan ................. 8-005565

[51] Int. Cl.⁶ ........................... H04B 10/04
[52] U.S. Cl. ........................ 359/180; 257/83
[58] Field of Search ................ 359/180, 161, 359/154, 152, 153; 257/83

[56] References Cited

U.S. PATENT DOCUMENTS

| 5,343,323 | 8/1994 | Lynn et al. ............... 359/180 |
| 5,398,008 | 3/1995 | Nissler et al. ............ 359/180 |

OTHER PUBLICATIONS

Suzaki, T. et al, "High-spped modulation characteristics of LD driver Ics with DMTs," 1989 IEICE (Institute of Electronics, Information and Communication Engineers, Autumn Conference), p. B–445 (with its English language translation).

Suematsu, Yasuharu and Hong, Tchang–Hee, "Suppression of Relaxation Oscillation in Light Output of Injection Lasers by Electrical Resonance Circuit", *IEEE Journal of Quantum Electronics*, vol. QE–13, No. 9 (Sep. 1977), pp. 756–762.

*Primary Examiner*—Kinfe-Michael Negash
*Attorney, Agent, or Firm*—Burns, Doane, Swecker & Mathis, LLP

[57] ABSTRACT

An optical transmitter in which a light-emitting device is driven by a differential circuit. Reflected waves occurring near the light-emitting device affect an FET of the output stage, which leads to degradation of its optical output waveforms. In order to resolve this problem, a reflection absorbing circuit is connected between the light-emitting device and the FET of the output stage. As the reflection absorbing circuit, a resistor or a resistor connected in series to a capacitor is used. A bipolar transistor may be used in place of an FET.

12 Claims, 9 Drawing Sheets

OPTICAL TRANSMITTER

DETAILED DESCRIPTION OF THE INVENTION

1. [Field of the Invention]

The invention relates to an optical transmitter for optical communication.

2. [Description of the Related Arts]

FIG. 9 shows a conventional optical transmitter proposed, for example, as FIG. 1 in B-445 of the 1989 IEICE (Institute of Electronics, Information and Communication Engineers) Autumn Conference. In FIG. 9, 1 is an input buffer having a differential type mechanism; 2 and 3 are FETs (field-effect transistors), having a differential type mechanism, to output positive-or negative-phase-sequence signals; 4 is an FET as a constant-current source; 5 is an LD (laser diode) as a light-emitting device; and 6 is an LD biasing circuit to control an LD bias current.

Next, its operation will be described. Input buffer 1 generates both positive-and negative-phase-sequence signals by comparing signals input from Vin terminal with a reference voltage. The positive-phase-sequence signals output from input buffer 1 are connected to the gate of FET 2 and its negative-phase-sequence signals are connected to the gate of FET 3. The sources of FET 2 and FET 3 are both connected to the drain of FET 4, a constant-current source. FET 2 and FET 3 are of the type which generate a more powerful current with a low gate voltage. As a result signals are inverted by FET 2 and FET 3. FET 2 receives positive-phase-sequence signals and converts negative-phase-sequence signals into the drive current of a light-emitting device having a peak value determined by FET 4 and outputs it. FET 3 receives negative-phase-sequence signals and converts positive-phase-sequence signals into the drive current of the light-emitting device having a peak value determined by FET 4 and outputs it. As the drain of FET 2 is connected to GND, its output current flows directly to GND. The drain of FET 3 is connected to the cathode of light-emitting device LD5 and a desired driving current are provided to light-emitting device LD5. This enables light-emitting device LD5 to output optical signals in accordance with the waveform of a driving current. By the way, there is, in general, a threshold DC current below which an LD outputs almost no optical signal. Therefore, in optical communication, in general, a DC current approximately equal to this threshold current (hereinafter called "the bias current") is previously provided to an LD and a signal current is additionally provided to it to obtain the waveform of optical signals. LD biasing circuit 6 is a current source for providing the bias current to light-emitting device LD5 for this purpose.

However, in a conventional optical transmitter, reflected waves occur independent of the impedance of the designed/manufactured line between the drain terminal of an FET providing a signal current to a light-emitting device and the light-emitting device. This results from the change in the impedance of the light-emitting device itself depending on a value of the provided current, the change in the impedance near the light-emitting device depending on a frequency due to the capacitance and inductor components of the chip and modules, and so on. Also the reflected waves will affect the drain terminal of the FET to degrade drive waveforms, which leads to degradation of the optical output waveforms. At low signal speeds this problem is avoidable with the shortest possible line between the drain terminal of the FET and the light-emitting device, but at higher signal speeds the effect cannot be neglected.

SUMMARY OF THE INVENTION

The present invention is intended to resolve problems such as those mentioned above and its purpose is to remove the effect of the reflected waves necessarily occurring due to the change in the impedance near the light-emitting device, to provide good drive current waveforms to the light-emitting device, and to obtain good optical output waveforms.

An optical transmitter according to the invention has a configuration in which a reflection absorbing circuit for absorbing reflected waves occurring near a light-emitting device is added between the light-emitting device and the drain of an FET providing signals to the light-emitting device.

Further, an optical transmitter according to the invention has a configuration in which a reflection absorbing circuit and a damping resistor for absorbing reflected waves occurring near a light-emitting device are added between the light-emitting device and the drain of an FET providing signals to the light-emitting device.

Further, an optical transmitter according to the invention has a configuration in which a reflection absorbing circuit and a filter for absorbing reflected waves occurring near a light-emitting device are added between the light-emitting device and the drain of an FET providing signals to the light-emitting device.

Further, an optical transmitter according to the invention has a configuration in which a reflection absorbing circuit, a damping resistor, and a filter for absorbing reflected waves occurring near a light-emitting device are added between the light-emitting device and the drain of an FET providing signals to the light-emitting device.

Further, an optical transmitter according to the invention has a configuration in which a reflection absorbing circuit for absorbing reflected waves occurring near a light-emitting device is added between the light-emitting device and the collector of a transistor providing signals to the light-emitting device.

Further, an optical transmitter according to the invention has a configuration in which a reflection absorbing circuit and a damping resistor for absorbing reflected waves occurring near a light-emitting device are added between the light-emitting device and the collector of a transistor providing signals to the light-emitting device.

Further, an optical transmitter according to the invention has a configuration in which a reflection absorbing circuit and a filter for absorbing reflected waves occurring near a light-emitting device are added between the light-emitting device and the collector of a transistor providing signals to the light-emitting device.

Further, an optical transmitter according to the invention has a configuration in which a reflection absorbing circuit, a damping resistor, and a filter for absorbing reflected waves occurring near a light-emitting device are added between the light-emitting device and the collector of a transistor providing signals to the light-emitting device.

DESCRIPTION OF THE PREFERRED EMBODIMENTS

Preferred Embodiment 1

Figure 1A:
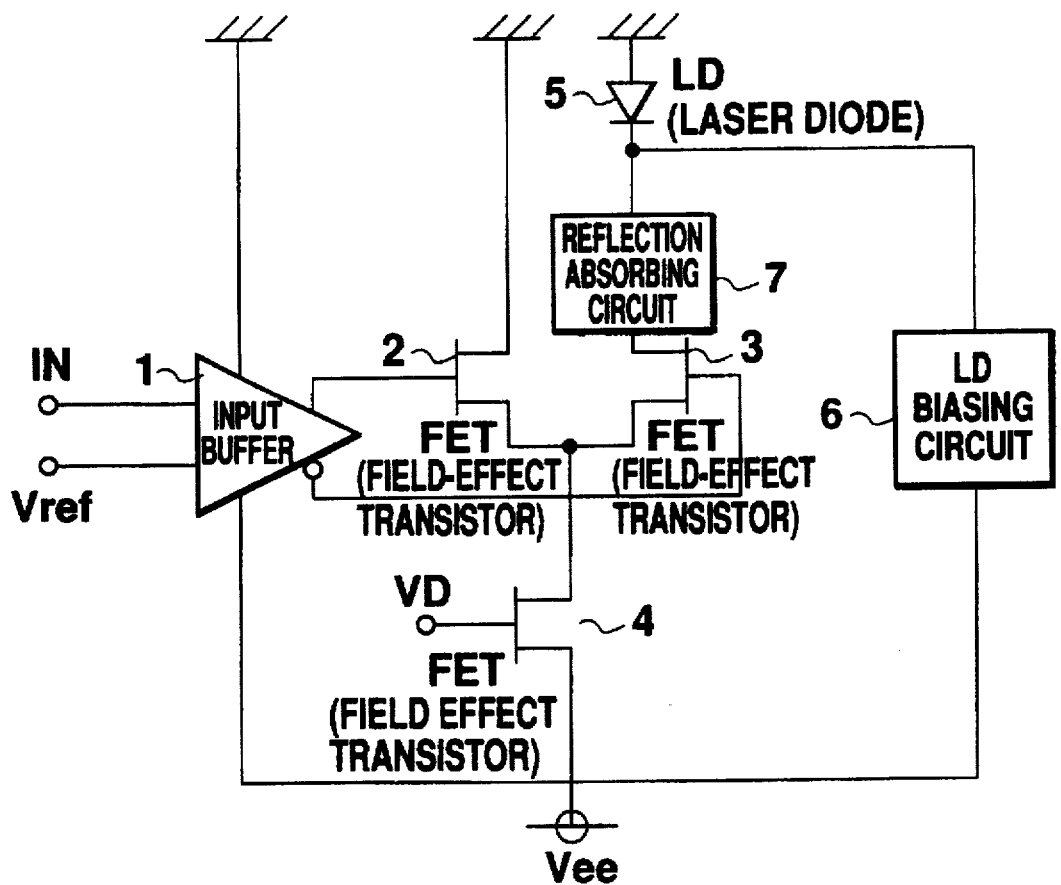
FIG. 1A is a circuit diagram showing preferred embodiment 1 of the optical transmitter of the present invention.

FIG. 1A shows preferred embodiment 1 of the invention. In FIG. 1A, 1 is an input buffer having a differential type configuration; 2 and 3 are FETs (field-effect transistors), having a differential type configuration, for outputting positive-or negative-phase-sequence signals; 4 is an FET as a constant-current source; 5 is an LD (laser diode) as a light-emitting device; 6 is an LD biasing circuit for controlling an LD bias current; and 7 is a reflection absorbing circuit. Another light-emitting device such as an LED (light-emitting diode) may be used in place of the LD in FIG. 1A which is shown only as a typical light-emitting device. Input buffer 1 may be omitted or have another configuration. The circuit using FET 4 is illustrated as a constant-current source, but a current source having another configuration may be used. LD biasing circuit 6 may be omitted. GND-Vcc (positive power source) or Vee (negative power source) -Vcc (positive power source) may be used in place of GND-Vee (negative power source) which is illustrated only as a typical power source.

Next, the operation of embodiment 1 will be described. Input buffer 1 generates both positive-and negative-phase-sequence signals by comparing signals input from Vin terminal with a reference voltage. The positive-phase-sequence signals output from input buffer 1 are connected to the gate of FET 2 and its negative-phase-sequence signals are connected to the gate of FET 3. The sources of FET 2 and FET 3 are both connected to the drain of FET 4, a constant-current source. FET 2 and FET 3 are of the type which generate a more powerful current with a low gate voltage. As a result, signals are inverted by FET 2 and FET 3. FET 2 receives positive-phase-sequence signals and converts the negative-phase-sequence signals into current values determined by FET 4 and outputs them. FET 3 receives negative-phase-sequence signals and converts the positive-phase-sequence signals into current values determined by FET 4 and outputs them. As the drain of FET 2 is connected to GND, its output current flows directly to GND. The drain of FET 3 is connected to the cathode of light-emitting device LD5 through reflection absorbing circuit 7, and by providing a desired current to LD5 enables it to radiate and output optical signals. There is a threshold DC current below which an LD outputs almost no optical signal. In an optical transmitter, in general, a current approximately equal to this threshold current is provided to the LD as the bias current and a high-frequency signal current is additionally provided to it. LD biasing circuit 6 is a current source for providing this bias current to LD5.

However, reflected waves occur near the LD because of the change in the impedance of the LD depending on a value of a provided current, the change in the impedance near the light-emitting device depending on a frequency due to the capacitance and inductor components of the LD chip and modules, and so on. These reflected waves will affect not only the drain of FET 3 but also the waveforms of the drive current of the light-emitting device, which leads to degradation of the optical output waveforms of LD5. Reflection absorbing circuit 7 has a function of preventing its optical output waveforms from degrading by absorbing these reflected waves.

Figure 1B:
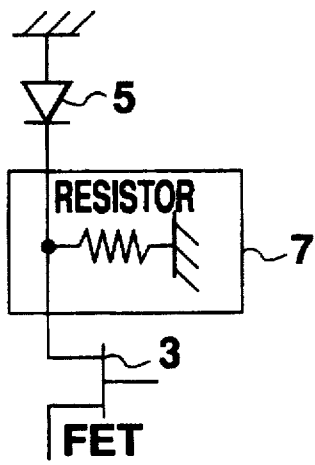
FIG. 1B is a circuit diagram of the reflection absorbing circuit of the present invention.
Figure 1C:
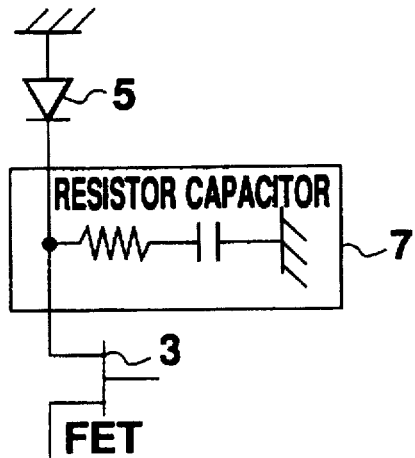
FIG. 1C is another circuit diagram of the reflection absorbing circuit of the present invention.

FIGS. 1B and 1C show examples of a reflection absorbing circuit. Example 1 of a reflection absorbing circuit in FIG. 1B has a simple configuration having one resistor. When this resistance value is slightly lower than the output impedance of FET 3, most of the reflected waves will be fed into the resistor side and the reflected waves returning to the output of FET 3 will significantly reduce. This gives good drive waveforms of LD5, which leads to good waveforms of the optical output of LD5.

Example 2 of a reflection absorbing circuit in FIG. 1C has a configuration having one resistor and one capacitor. Example 1 of a reflection absorbing circuit in FIG. 1B is valid for all frequencies due to its mechanism having one resistor, but at the same time the mechanism will reduce the peak current of the driving waveforms, resulting in a lot of wasted power. However, the configuration of example 2 can be expected to remove reflected waves only for frequencies over a desired frequency where reflection becomes significant and to have the same effect, without reducing the peak current of the driving waveforms for frequencies under a desired frequency, as is the case with Example 1. Example 2 with a configuration having only one capacitor can be expected to have the above effect.

Preferred Embodiment 2

Figure 2:
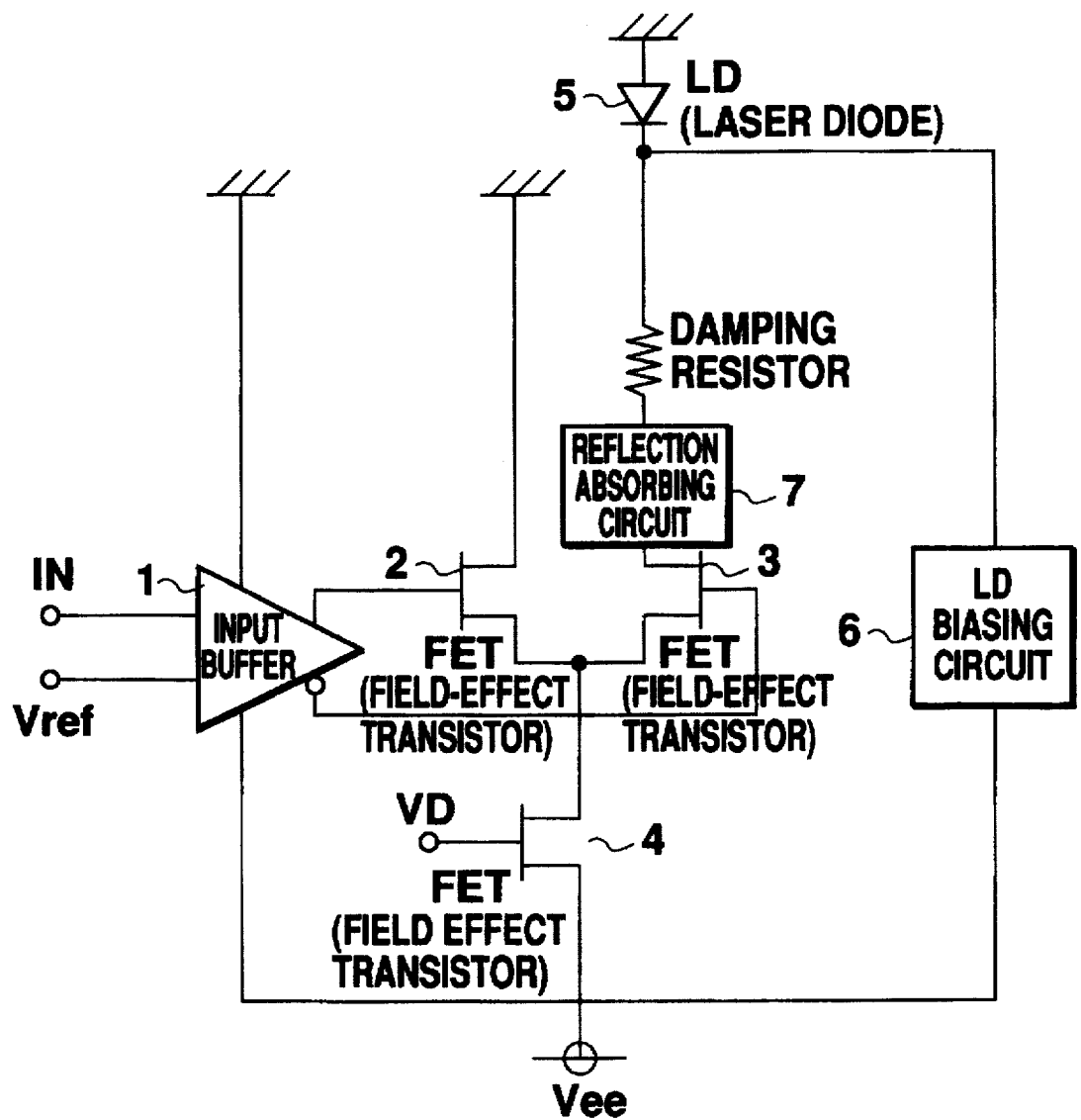
FIG. 2 is a circuit diagram showing preferred embodiment 2 of the optical transmitter of the present invention.

FIG. 2 shows preferred embodiment 2 of the invention. In FIG. 2, 1–7 are the same as those of preferred embodiment 1. 8 is a damping resistor. Another light-emitting device such as an LED may be used in place of the LD in FIG. 2 which is shown only as a typical light-emitting device. Input buffer 1 may be omitted or have another configuration. The circuit using FET 4 is illustrated as a constant-current source, but a current source having another configuration may be used. LD biasing circuit 6 may be omitted. GND-Vcc (positive power source) or Vee (negative power source)-Vcc (positive power source) may be used in place of GND-Vee (negative power source) which is illustrated only as a typical power source.

Next, the operation of the second embodiment will be described. The operation of components 1–7 in FIG. 2 is identical to that of preferred embodiment 1. Here only the operation of damping resistor 8 will be described. In general, the frequency characteristic of a light-emitting device, for example an LD, has a peak called relaxation oscillation. Therefore, AC driving a light-emitting device, for example an LD, often results in optical output waveforms with overshoot/undershoot, especially at the rising edge. Adding damping resistor 8 makes the load of FET 3 high, which will shape the waveforms of the drive current for LD5.

Preferred Embodiment 3

Figure 3:
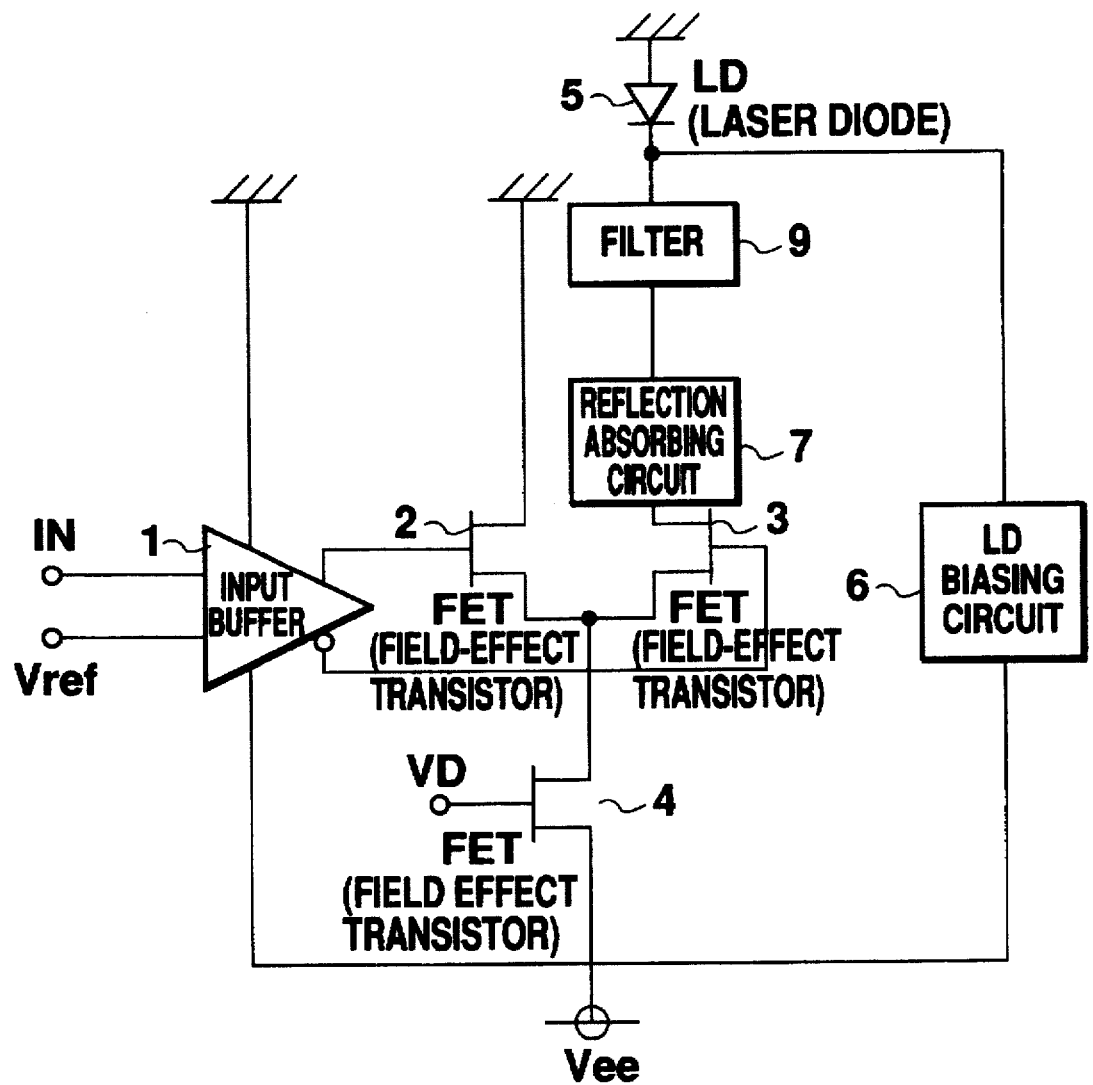
FIG. 3 is a circuit diagram showing preferred embodiment 3 of the optical transmitter of the present invention.

FIG. 3 shows preferred embodiment 3 of the invention. In FIG. 3, 1–7 are the same as those of preferred embodiment 1. 9 is a filter. Another light-emitting device such as an LED may be used in place of the LD in FIG. 3 which is shown only as a typical light-emitting device. Input buffer 1 may be omitted or have another configuration. The circuit using FET 4 is illustrated as a constant-current source, but a current source having another configuration may be used. LD biasing circuit 6 may be omitted. GND-Vcc (positive power source) or Vee (negative power source)-Vcc (positive power source) may be used in place of GND-Vee (negative power source) which is illustrated only as a typical power source.

Next, the operation of the third embodiment will be described. The operation of components 1–7 in FIG. 3 is identical to that of preferred embodiment 1. Here only the operation of filter 9 will be described. The frequency characteristic of a light-emitting device, for example an LD, has a peak called relaxation oscillation. Therefore, AC driving a light-emitting device, for example an LD, often results in optical output waveforms with overshoot/undershoot especially at their rising edge. Filter 9 removes this peak in the frequency characteristic. Filter 9 may have a configuration having C (capacitor), L (inductor) C, or R (resistor) C and is generally a low-pass filter.

Preferred Embodiment 4

Figure 4:
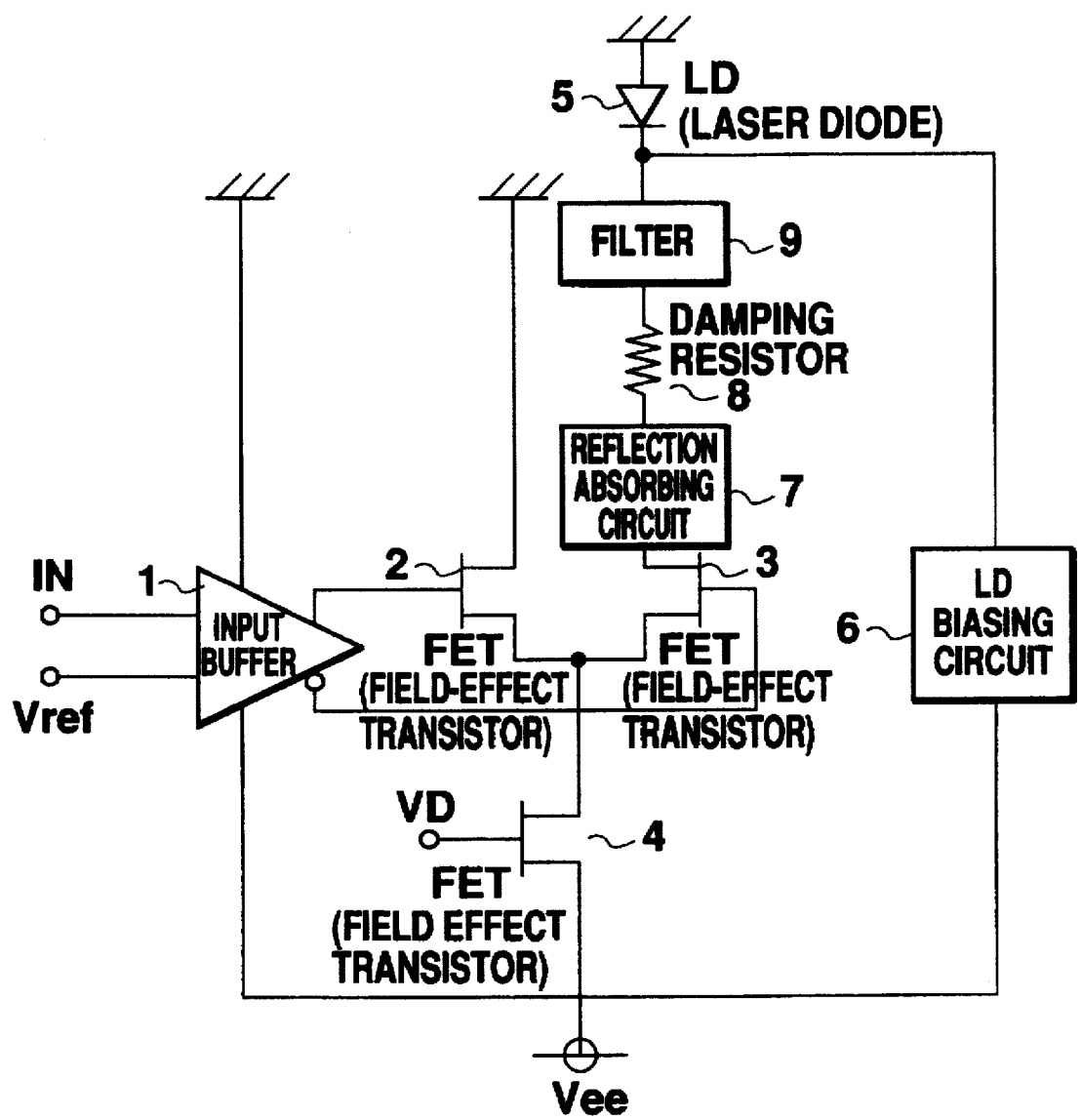
FIG. 4 is a circuit diagram showing preferred embodiment 4 of the optical transmitter of the present invention.

FIG. 4 shows preferred embodiment 4 of the invention. In FIG. 4, 1–7 are the same as those of preferred embodiment 1. 8 is a damping resistor and 9 is a filter. Another light-emitting device such as an LED may be used in place of the LD in FIG. 4 which is shown only as a typical light-emitting device. Input buffer 1 may be omitted or have another configuration. The circuit using FET 4 is illustrated as a constant-current source, but a current source having another configuration may be used. LD biasing circuit 6 may be omitted. GND-Vcc (positive power source) or Vee (negative power source)-Vcc (positive power source) may be used in place of GND-Vee (negative power source) which is illustrated only as a typical power source.

Next, the Operation of the fourth embodiment will be described. The operation of components 1–7 in FIG. 4 is identical to that of preferred embodiment 1. Here, only the operation of damping resistor 8 and filter 9 will be described. The frequency characteristic of a light-emitting device, for example an LD, has a peak called relaxation oscillation. Therefore, AC driving a light-emitting device, for example an LD, often results in optical output waveforms with overshoot/undershoot especially, at their rising edge. Damping resistor 8 makes the load of FET 3 high and filter 9 removes the peak in the frequency characteristic.

Preferred Embodiment 5

Figure 5:
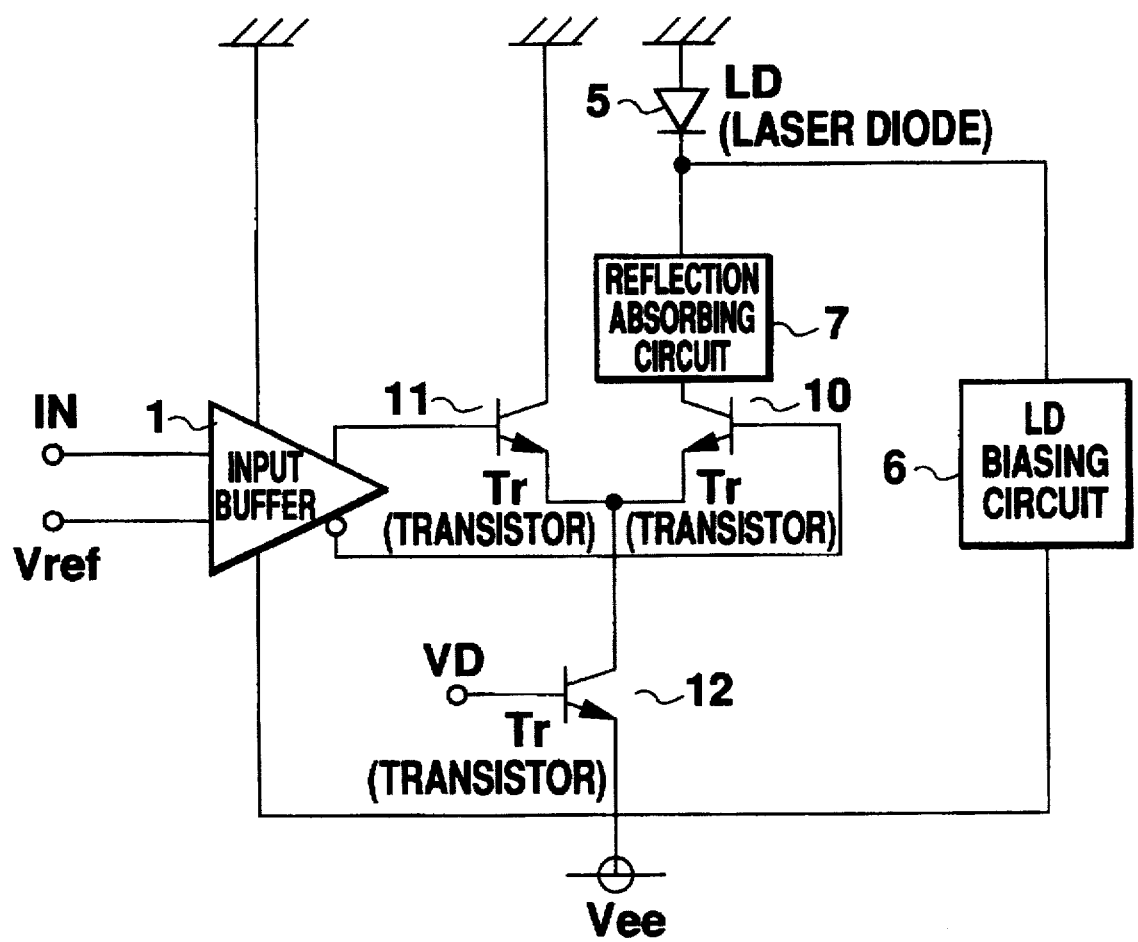
FIG. 5 is a circuit diagram showing preferred embodiment 5 of the optical transmitter of the present invention.

FIG. 5 shows preferred embodiment 5 of the invention. In FIG. 5, 1 is an input buffer having a differential type configuration; 5 is an LD (laser diode) as a light-emitting device; 6 is an LD biasing circuit for controlling an LD bias current; 7 is a reflection absorbing circuit; 10 and 11 are transistors (bipolar transistors), having a differential type configuration, for outputing positive-or negative-phase-sequence signals; and 12 is a transistor as a constant-current source. Another light-emitting device such as an LED (light-emitting diode) may be used in place of the LD in FIG. 5 which is shown only as a typical light-emitting device. Input buffer 1 may be omitted or have another configuration. The circuit using transistor 12 is illustrated as a constant-current source, but a current source having another configuration may be used. LD biasing circuit 6 may be omitted. GND-Vcc (positive power source) or Vee (negative power source) -Vcc (positive power source) may be used in place of GND-Vee (negative power source) which is illustrated only as a typical power source.

Next, the operation of the fifth embodiment will be described. Input buffer 1 generates both positive-and negative-phase-sequence signals by comparing signals input from Vin terminal with a reference voltage. The positive-phase-sequence signals output from input buffer 1 are connected to the base of transistor 10 and its negative-phase-sequence signals are connected to the base of transistor 11. The emitters of transistor 10 and transistor 11 are both connected to the collector of transistor 12, a constant-current source. Transistor 10 receives positive-phase-sequence signals and converts them into current values determined by transistor 12 and outputs the values. Transistor 11 receives negative-phase-sequence signals and converts them into current values determined by transistor 12 and outputs the values. As the collector of transistor 11 is connected to GND, its output current flows directly to GND. The collector of transistor 10 is connected to the cathode of light-emitting device LD5 through reflection absorbing circuit 7 and provides a desired current to LD5, enabling it to radiate and output optical signals. There is a threshold DC current below which an LD outputs almost no optical signal. In an optical transmitter, in general, a current approximately equal to this threshold current is provided to the LD as the bias current and a high-frequency signal current is additionally provided to it. LD biasing circuit 6 is a current source to provide this bias current to LD5.

However, reflected waves occur near the LD because of the change in the impedance of the LD depending on a value of a provided current, the change in the impedance near the light-emitting device depending on a frequency due to the capacitance and inductor components of the LD chip and modules, and so on. These reflected waves will affect not only the collector of transistor 10 but also the waveforms of the drive current of the light-emitting device, which leads to degradation of the optical output waveforms of LD5. Reflection absorbing circuit 7 has the function to preventing its optical output waveforms from degrading by absorbing these reflected waves. The above operation is almost the same as that of preferred embodiment 1 except that, in preferred embodiment 5, transistors are used in place of FETs.

Preferred Embodiment 6

Figure 6:
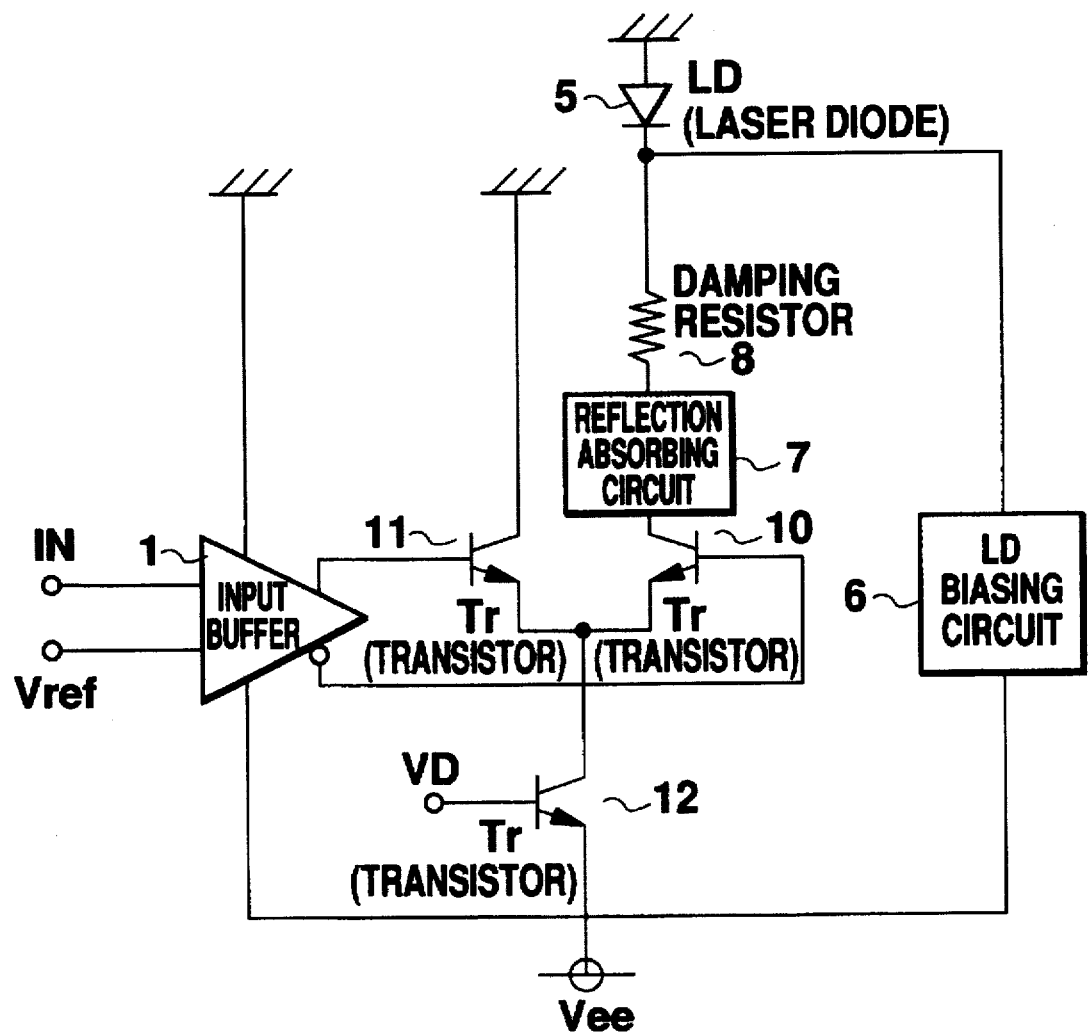
FIG. 6 is a circuit diagram showing preferred embodiment 6 of the optical transmitter of the present invention.

FIG. 6 shows preferred embodiment 6 of the invention. In FIG. 6, 1, 5–7, and 10–12 are the same as those of preferred embodiment 5. 8 is a damping resistor. Another light-emitting device such as an LED may be used in place of the LD in FIG. 6 which is shown only as a typical light-emitting device. Input buffer 1 may be omitted or have another configuration. The circuit using transistor 12 is illustrated as a constant-current source, but a current source having another configuration may be used. LD biasing circuit 6 may be omitted. GND-Vcc (positive power source) or Vee (negative power source)-Vcc (positive power source) may be used in place of GND-Vee (negative power source) which is illustrated only as a typical power source.

Next, the operation of the sixth embodiment will be described. The operation of components 1, 5–7, and 10–12 in FIG. 6 is identical to that of preferred embodiment 5. Here only the operation of damping resistor 8 will be described. In general, the frequency characteristic of a light-emitting device, for example an LD, has a peak called relaxation oscillation. Therefore, AC driving a light-emitting device, for example an LD, often results in optical output waveforms with overshoot/undershoot (especially at their rising edge). Adding damping resistor 8 makes the load of transistor 10 high, which will shape the waveforms of the driving current of LD5.

Preferred Embodiment 7

Figure 7:
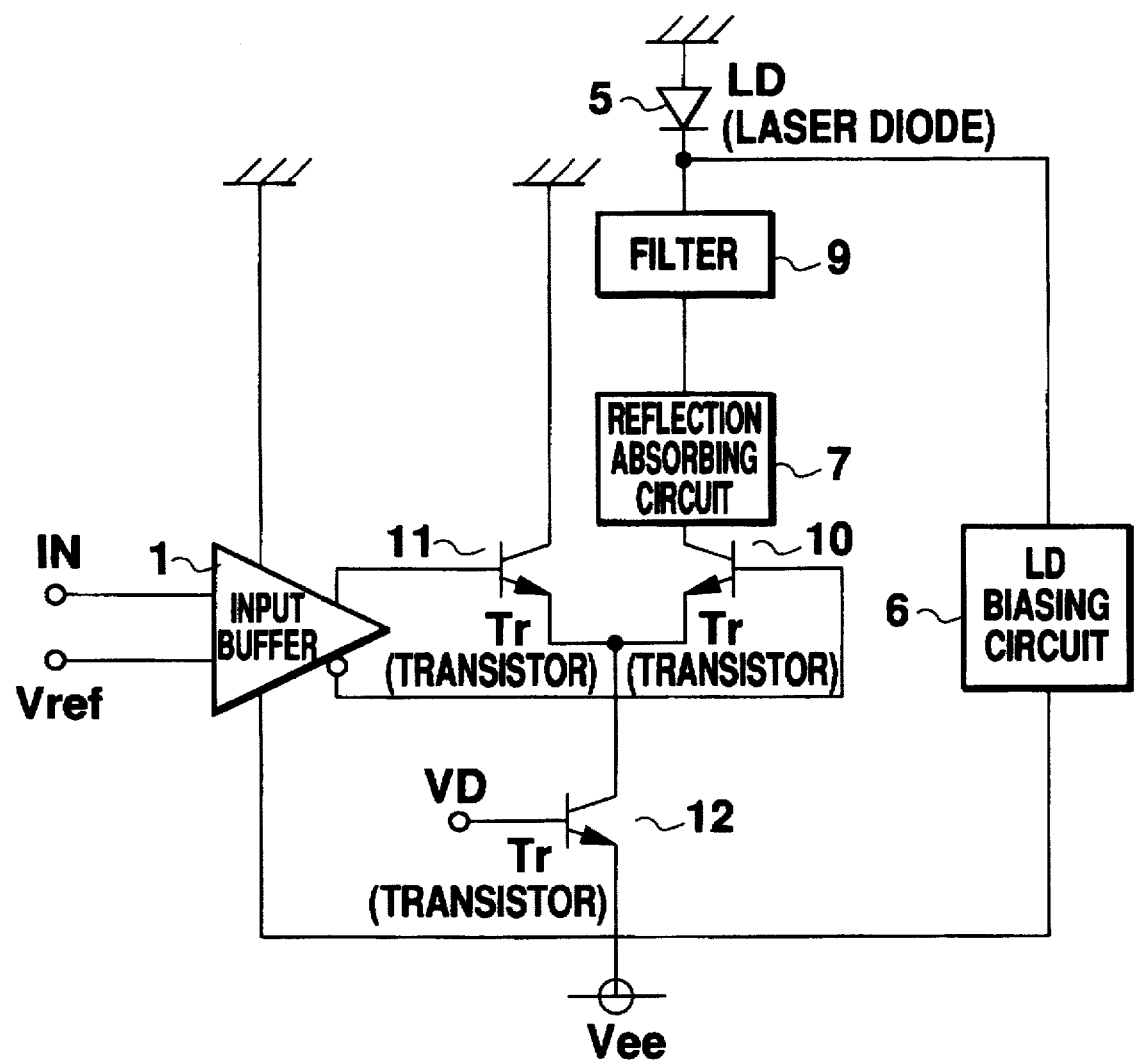
FIG. 7 is a circuit diagram showing preferred embodiment 7 of the optical transmitter of the present invention.

FIG. 7 shows preferred embodiment 7 of the invention. In FIG. 7, 1, 5–7, and 10–12 are the same as those of preferred embodiment 5. 9 is a filter. Another light-emitting device such as an LED may be used in place of the LD in FIG. 7 which is shown only as a typical light-emitting device. Input buffer 1 may be omitted or have another configuration. The circuit using transistor 12 is illustrated as a constant-current source, but a current source having another configuration may be used. LD biasing circuit 6 may be omitted. GND-Vcc (positive power source) or Vee (negative power source) -Vcc (positive power source) may be used in place of GND-Vee (negative power source) which is illustrated only as a typical power source.

Next, the operation of the seventh embodiment will be described. The operation of components 1, 5–7, and 10–12 in FIG. 7 is identical to that of preferred embodiment 5. Here only the operation of filter 9 will be described. The frequency characteristic of a light-emitting device, for example an LD, has a peak called relaxation oscillation. Therefore, AC driving a light-emitting device, for example an LD, often results in optical output waveforms with overshoot/undershoot especially at their rising edge. Filter 9 removes this peak in the frequency characteristic. Filter 9 may have a configuration having C (capacitor), L (inductor) C, or R (resistor) C and is generally a low-pass filter.

Preferred Embodiment 8

Figure 8:
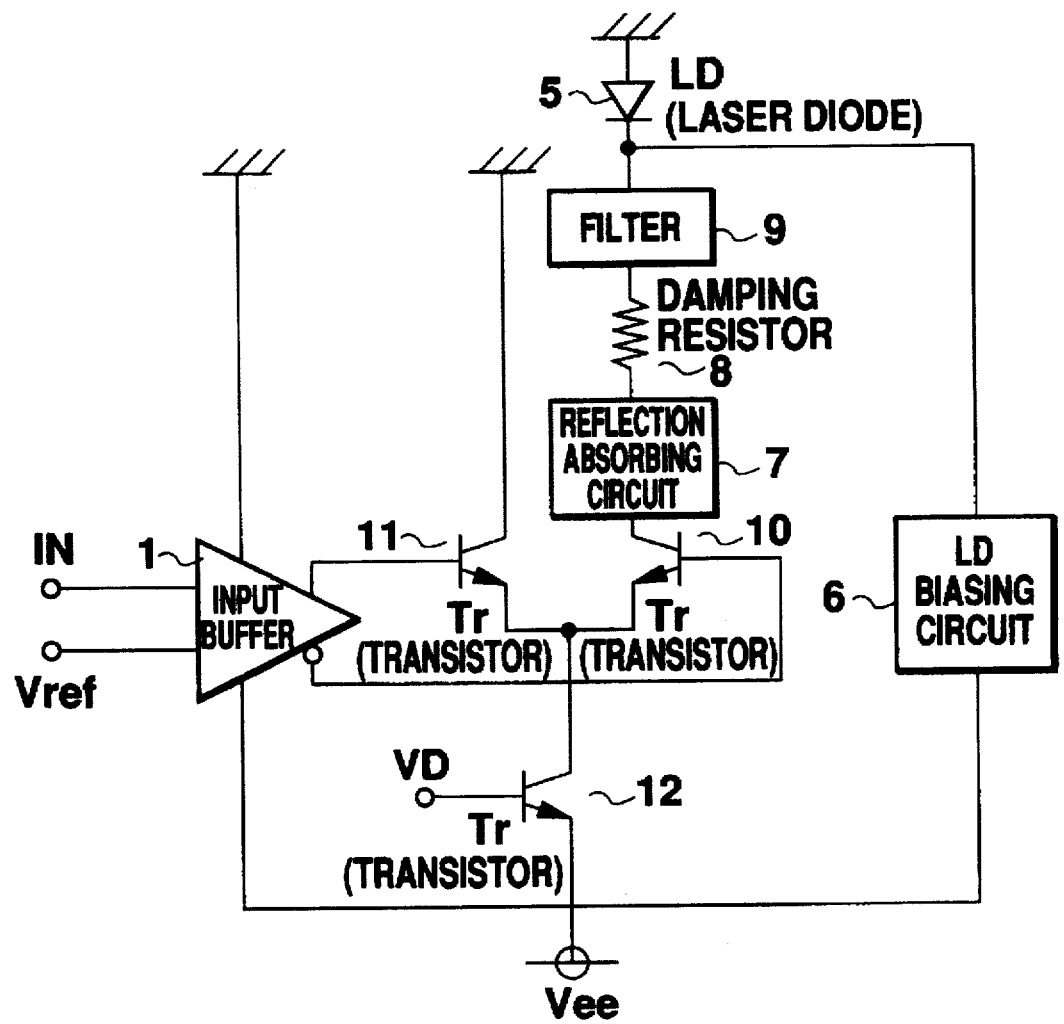
FIG. 8 is a circuit diagram showing preferred embodiment 8 of the optical transmitter of the present invention.
Figure 9:
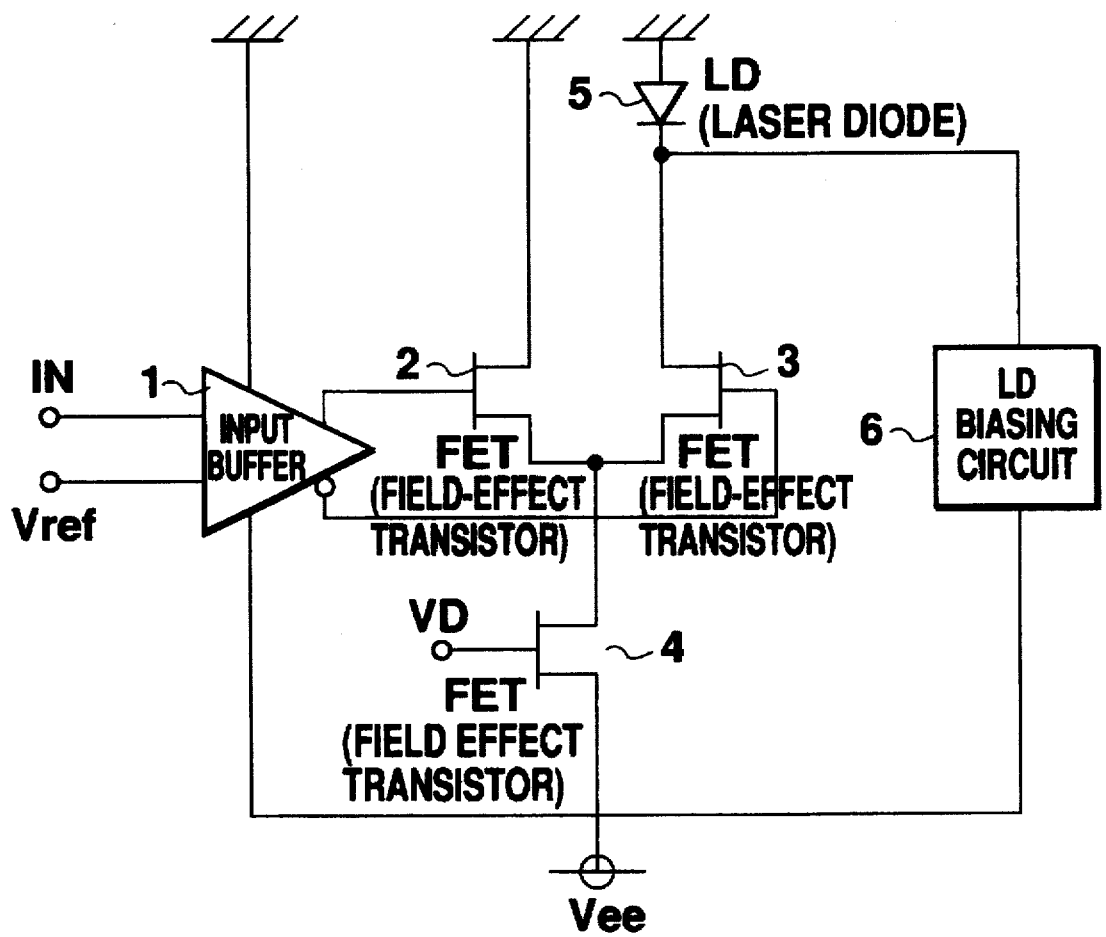
FIG. 9 is a circuit diagram of a prior art optical transmitter.

FIG. 8 shows preferred embodiment 8 of the invention. In FIG. 8, 1, 5–7, and 10–12 are the same as those of preferred embodiment 5. 8 is a damping resistor and 9 is a filter. Another light-emitting device such as an LED may be used in place of the LD in FIG. 8 which is shown only as a typical light-emitting device. Input buffer 1 may be omitted or have another configuration. The circuit using transistor 12 is illustrated as a constant-current source, but a current source having another configuration may be used. LD biasing circuit 6 may be omitted. GND-Vcc (positive power source) or Vee (negative power source)-Vcc (positive power source) may be used in place of GND-Vee (negative power source) which is illustrated only as a typical power source.

Next, the operation of the eighth embodiment will be described. The operation of components 1, 5–7, and 10–12 in FIG. 8 is identical to that of preferred embodiment 5. Here only the operation of damping resistor 8 and filter 9 will be described. The frequency characteristic of a light-emitting device, for example an LD, has a peak called relaxation oscillation. Therefore, AC driving a light-emitting device, for example an LD, often results in its optical output waveforms with overshoot/undershoot especially at their rising edge. Damping resistor 8 makes the load of transistor 10 high and filter 9 removes the peak in the frequency characteristic.

According to the present invention, the effect caused by the reflected waves necessarily occurring due to the change in the impedance near the light-emitting device can be removed and good waveforms of a drive current can be provided to the light-emitting device to obtain good optical output waveforms, as described above. While there has been described what are at present considered to be preferred embodiments of the invention, it will be understood that various modifications may be made thereto, and it is intended that the appended claims cover all such modifications as fall within the true spirit and scope of the invention.

What is claimed is:

1. An optical transmitter comprising:
   (a) a current source;
   (b) a first FET having a source terminal connected to said current source and a gate terminal supplied with positive-phase-sequence signals;
   (c) a second FET having a source terminal connected to said current source and a gate terminal supplied with negative-phase-sequence signals;
   (d) a light-emitting device connected to the drain terminal of either said first FET or said second FET; and
   (e) a reflection absorbing circuit connected between the drain terminal of either said first FET or said second FET and said light-emitting device.

2. The optical transmitter according to claim 1, further comprising:
   (f) a damping resistor connected between said reflection absorbing circuit and said light-emitting device.

3. The optical transmitter according to claim 1, further comprising:
   (f) a filter connected between said reflection absorbing circuit and said light-emitting device.

4. The optical transmitter according to claim 1, further comprising:
   (f) a damping resistor connected between said reflection absorbing circuit and said light-emitting device; and
   (g) a filter connected in series to said damping resistor between said reflection absorbing circuit and said light-emitting device.

5. The optical transmitter according to claim 1, wherein said reflection absorbing circuit includes a resistor having a lower resistance value than the output impedance of said first FET or said second FET it is connected to.

6. The optical transmitter according to claim 1, wherein said reflection absorbing circuit includes a resistor having a lower resistance value than the output impedance of said first FET or said second FET it is connected to, and a capacitor connected in series to this resistor.

7. An optical transmitter comprising:
   (a) a current source;
   (b) a first transistor having an emitter terminal connected to said current source and a base terminal supplied with positive-phase-sequence signals;
   (c) a second transistor having an emitter terminal connected to said current source and a base terminal supplied with negative-phase-sequence signals;
   (d) a light-emitting device connected to the collector terminal of either said first transistor or said second transistor; and
   (e) a reflection absorbing circuit connected between the collector terminal of either said first transistor or said second transistor and said light-emitting device.

8. The optical transmitter according to claim 7, further comprising:
   (f) a damping resistor connected between said reflection absorbing circuit and said light-emitting device.

9. The optical transmitter according to claim 7, further comprising:
   (f) a filter connected between said reflection absorbing circuit and said light-emitting device.

10. The optical transmitter according to claim 7, further comprising:
    (f) a damping resistor connected between said reflection absorbing circuit and said light-emitting device; and
    (g) a filter connected in series to said damping resistor between said reflection absorbing circuit and said light-emitting device.

11. The optical transmitter according to claim 7, wherein said reflection absorbing circuit includes a resistor having a lower resistance value than the output impedance of said first transistor or said second transistor it is connected to.

12. The optical transmitter according to claim 7, wherein said reflection absorbing circuit includes a resistor having a lower resistance value than the output impedance of said first transistor or said second transistor it is connected to and a capacitor connected in series to this resistor.

* * * * *